United States Patent
Somanache et al.

(10) Patent No.: US 8,645,618 B2
(45) Date of Patent: Feb. 4, 2014

(54) FLEXIBLE FLASH COMMANDS

(75) Inventors: Vinay Ashok Somanache, Pune-Maharashtra (IN); Jackson L. Ellis, Fort Collins, CO (US); Michael S. Hicken, Rochester, MN (US); Timothy W. Swatosh, Rochester, MN (US); Martin S. Dell, Bethlehem, PA (US); Pamela S. Hempstead, Oronoco, MN (US)

(73) Assignee: LSI Corporation, San Jose, CA (US)

( * ) Notice: Subject to any disclaimer, the term of this patent is extended or adjusted under 35 U.S.C. 154(b) by 223 days.

(21) Appl. No.: 13/332,849

(22) Filed: Dec. 21, 2011

(65) Prior Publication Data

US 2013/0019050 A1    Jan. 17, 2013

Related U.S. Application Data

(60) Provisional application No. 61/507,665, filed on Jul. 14, 2011.

(51) Int. Cl.
  *G06F 12/00* (2006.01)
(52) U.S. Cl.
  USPC ......................................................... 711/103
(58) Field of Classification Search
  None
  See application file for complete search history.

(56) References Cited

U.S. PATENT DOCUMENTS

| 4,030,072 | A | 6/1977 | Bjornsson | 340/172.5 |
| 4,776,533 | A | 10/1988 | Sheek et al. | 364/200 |
| 5,430,841 | A | 7/1995 | Tannenbaum et al. | 395/164 |
| 5,438,668 | A | 8/1995 | Coon et al. | 395/375 |
| 5,546,552 | A | 8/1996 | Coon et al. | 395/375 |
| 5,619,666 | A | 4/1997 | Coon et al. | 395/384 |
| 5,692,138 | A * | 11/1997 | Fandrich et al. | 710/305 |
| 6,954,847 | B2 | 10/2005 | Coon et al. | 712/208 |
| 7,664,935 | B2 | 2/2010 | Coon et al. | 712/210 |
| 7,817,767 | B2 | 10/2010 | Tell et al. | 375/376 |
| 8,019,975 | B2 | 9/2011 | Brashears et al. | 712/225 |
| 2009/0164704 | A1 * | 6/2009 | Kanade et al. | 711/103 |
| 2010/0023682 | A1 | 1/2010 | Lee et al. | 711/103 |
| 2010/0083247 | A1 | 4/2010 | Kanevsky et al. | |
| 2010/0125579 | A1 | 5/2010 | Pardoe et al. | 707/736 |
| 2011/0131346 | A1 | 6/2011 | Noeldner et al. | 710/22 |

FOREIGN PATENT DOCUMENTS

WO   WO2010/0033455 A1   3/2010   ............. G06F 12/02

* cited by examiner

*Primary Examiner* — Hiep Nguyen
(74) *Attorney, Agent, or Firm* — Christopher P. Maiorana, PC

(57) ABSTRACT

A method of controlling a flash media system. The method includes providing a flash lane controller having a processor control mode and creating and presenting soft contexts. The soft contexts generally place the flash lane controller into the processor control mode. In the processor control mode, the flash lane controller stores the entire soft context, finishes executing any outstanding contexts, suspends normal hardware automation, and then executes the soft context.

20 Claims, 9 Drawing Sheets

FIG. 10

| INSTRUCTION | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| FLASH BUS OPERATION | 1 | 1 | FLASH DEVICE | | | | OPTYPE | | | OPOPT | | | OPCOMMAND | | | | | | | ADDRLEN | | | | DATA LENGTH | | | | | | | |
| WAIT CYCLES | 00h | | | | | | | | | | | | | | | | NUMBER OF CYCLES TO WAIT | | | | | | | | | | | | | | | |
| WAIT FOR READY/BUSY | 01h | | | | | | | | | | | | | | | | | | | | | | | | | | | | | | | R/B |
| WAIT FOR STATUS | 02h | | | | | | | | | | | | CHIP ENABLE | | | | EXPECTED VALUE | | | | | | | | MASK | | | | | | | |
| WAIT FOR BUFFER STATE | 03h | | | | | | | | | | | | | | | | | | | | | | | | MASK | | | | | D | R | BN |
| SET POLLING PERIOD | 04h | | | | | | | | | | | | | | | | NUMBER OF CYCLES TO WAIT | | | | | | | | | | | | | | | |
| SET DATA TRANSFER LEN. | 05h | | | | | | | | | | | | | | | | | | | | DATA LENGTH | | | | | | | | | | | |
| SET FLASH ROW ADDRESS | 06h | | | | | | | | | | | | | | | | FLASH ROW ADDRESS | | | | | | | | | | | | | | | |
| SET FLASH COL. ADDRESS | 07h | | | | | | | | | | | | | | | | | | | | | | | | FLASH COLUMN ADDRESS | | | | | | | |
| SET STATUS COM. FORM. | 08h | | | | | | | | | | | | | | | | | | BITMAP | | | | | | COMMAND BYTE | | | | | | | |
| GET PASS/FAIL STATUS | 09h | | | | | | | | | | | | NE | OR | | | COMPARE VALUE | | | | | | | | MASK | | | | | | | |
| PREFETCH DATA | 0Ah | | | | | | | | | | | | WI | BN | | | | | | | | | | CONTEXT POINTER | | | | | | | | |
| SET READ DATA BUFFER | 0Bh | | | | | | | | | | | | WI | BN | | | | | | | | | | CONTEXT POINTER | | | | | | | | |
| DISPOSE OF CONTEXT PTR | 0Ch | | | | | | | | | | | | W | | | | | | | | | | | CONTEXT POINTER | | | | | | | | |
| ASSERT INTERRUPT | 0Dh | | | | | | | | | | | | | | | | | | | | | | | | | | | INTERRUPT IDENTIFIER | | | | |
| FETCH NEXT SOFT CONT. | 0Eh | | | | | | | | | | | | | | | | NEXT CONTEXT POINTER | | | | | | | | | | | | | | | |
| PROC. CONT. MODE DONE | 0Fh | | | | | | | | | | | | | | | | | | | | | | | | | | | | | | | |

300

| | BYTE 3 | BYTE 2 | BYTE 1 | BYTE 0 |
|---|---|---|---|---|
| DWORD0 | 00001110 | XXXXXXX0 | CONTEXT POINTER | |
| DWORD1 | 00000110 | | ROW ADDRESS | |
| DWORD2 | 00000101 | XXXXXXXX | 01000011 | 00100000 |
| DWORD3 | 00000011 | XXXXXXXX | XXXXXXXX | XXXXXX10 |
| DWORD4 | 11000000 | 00001000 | 0000XXXX | XXXXXXXX |
| DWORD5 | 11000000 | 1000XXXX | XXXX101X | XXXXXXXX |
| DWORD6 | 11000001 | 10000000 | 0000XXX0 | 00000000 |
| DWORD7 | 11000000 | 00000001 | 0000XXXX | XXXXXXXX |
| DWORD8 | 00000001 | XXXXXXXX | XXXXXXXX | XXXXXXX1 |
| DWORD9 | 11000000 | 00000111 | 0000XXXX | XXXXXXXX |
| DWORD10 | 11000001 | 00100000 | 0000XXX0 | 00000001 |
| DWORD11 | 00001001 | XXXXXX00 | 00000001 | 11111110 |
| DWORD12 | 00001100 | | 10101011 | 11001101 |
| DWORD13 | 00001111 | | | |

FLEXIBLE FLASH COMMANDS

This application claims the benefit of U.S. Provisional Application No. 61/507,665, filed Jul. 14, 2011 and is hereby incorporated by reference in its entirety.

FIELD OF THE INVENTION

The present invention relates to flash media systems generally and, more particularly, to a method and/or apparatus for implementing flexible flash commands.

BACKGROUND OF THE INVENTION

Flash memory interface commands are used to control the reading and writing of information to flash memory devices. The specific commands used to lock, unlock, program, or erase flash memories differ for each manufacturer. To avoid needing unique driver software for every device made, a conventional flash media controller can support a set of Common Flash Memory Interface (CFI) commands that allow the device to identify itself and its critical operating parameters. The Common Flash Memory Interface (CFI) commands simplify the hardware automation and simplify the firmware design while providing interoperability with existing flash devices. However, the Common Flash Memory Interface (CFI) commands do support a set of commands for attaining a particular performance from a particular flash device.

It would be desirable to implement a method and/or apparatus for implementing flexible flash commands.

SUMMARY OF THE INVENTION

The present invention concerns a method of controlling a flash media system. The method includes providing a flash lane controller having a processor control mode and creating and presenting soft contexts. The soft contexts generally place the flash lane controller into the processor control mode. In the processor control mode, the flash lane controller stores the entire soft context, finishes executing any outstanding contexts, suspends normal hardware automation, and then executes the soft context.

The objects, features and advantages of the present invention include providing a method and/or apparatus for implementing flexible flash commands that may (i) allow commands that are not natively supported by hardware to be applied flash units, (ii) provide a processor control mode that is only visible to a flash lane controller, (iii) allow hardware to be directed by firmware to perform almost any atomic operation that can be performed on flash, (iv) allow firmware to assume direct control of hardware resources built into a flash media controller to facilitate the control of the flash media and the movement of data, and/or (v) create and present soft contexts to control a flash media controller.

BRIEF DESCRIPTION OF THE DRAWINGS

These and other objects, features and advantages of the present invention will be apparent from the following detailed description and the appended claims and drawings in which:

FIG. 10 is a diagram illustrating an example set of nano-instructions for the nano sequencer of FIG. 9; and FIG. 11 is a diagram illustrating an example soft context in accordance with the present invention.

DETAILED DESCRIPTION OF THE PREFERRED EMBODIMENTS

In one embodiment, a system in accordance with the present invention may be designed to operate with various mass storage protocols, including SAS ("Serial Attached SCSI"), FC ("Fibre Channel") and FC-AL ("Fibre Channel Arbitrated Loop), all of which are based on the Small Computer Systems Interface ("SCSI"), and Serial ATA ("SATA") protocols. A person of ordinary skill in the art would be familiar with the mass storage protocols and, therefore, such protocols will not be further described herein. Except where particular protocols are called out, the systems and methods disclosed herein do not depend on the particular protocol being used and are designed to operate correctly with all of the protocols. Moreover, the systems and methods in accordance with embodiments of the present invention may be adapted for use with other similar protocols, either currently in use or yet to be developed, including protocols for enterprise-level applications as well as protocols for other applications, such as end-user. The system described herein includes a novel method for providing flexible flash commands.

Figure 1:
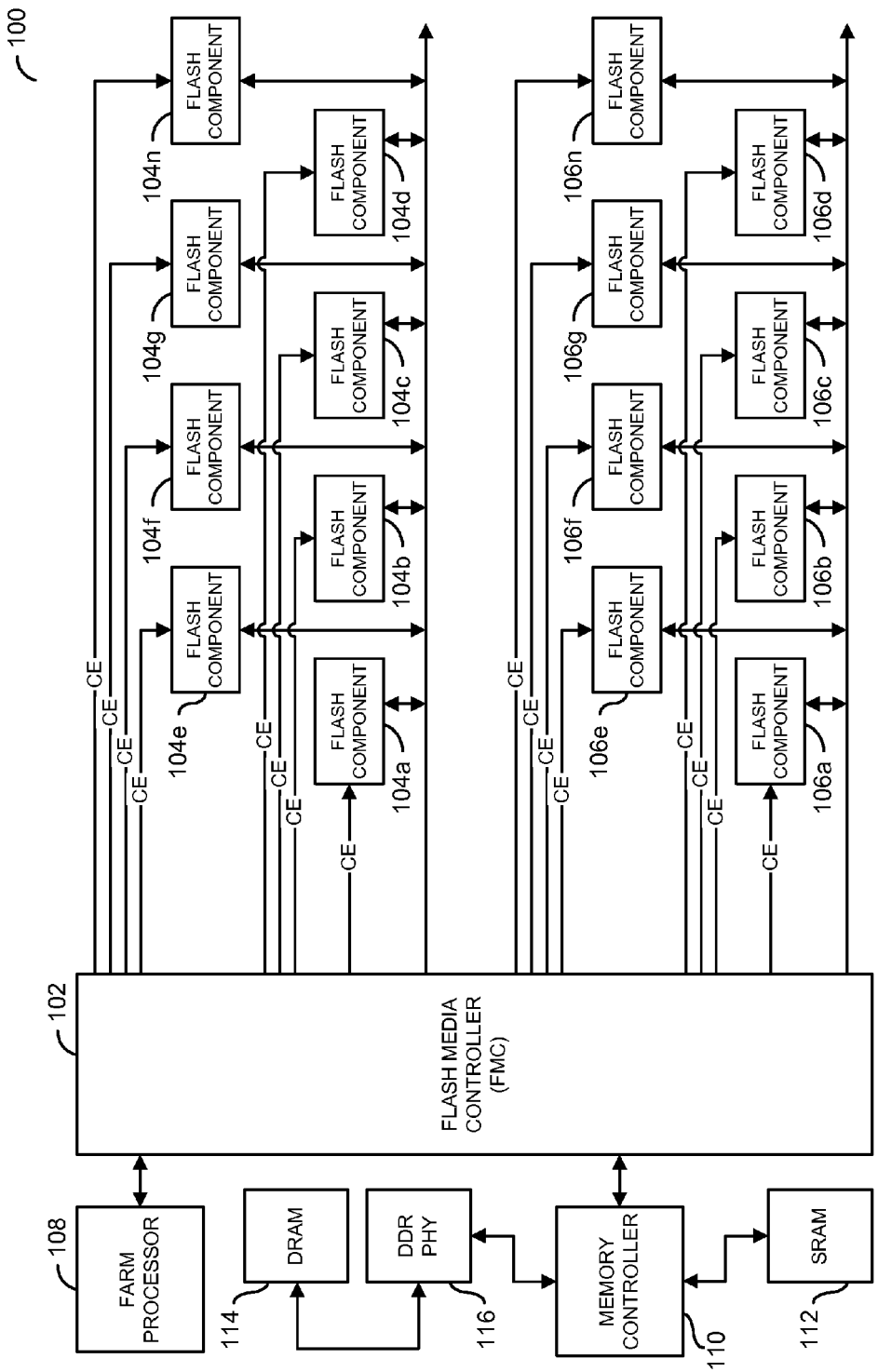
FIG. 1 is a block diagram illustrating a flash media controller implemented in a system on a chip (SOC) context.

Referring to FIG. 1, a block diagram of a system 100 is shown implemented with a flash media controller in accordance with an embodiment of the present invention. In one example, the system (or architecture) 100 may comprise a block (or circuit) 102, a number of blocks (or circuits) 104a-104n, a number of blocks (or circuit) 106a-106n, a block (or circuit) 108, a block (or circuit) 110, a block (or circuit) 112, a block (or circuit) 114, and a block (or circuit) 116. The circuits 102 through 116 may represent modules and/or blocks that may be implemented as hardware, firmware, software, a combination of hardware, firmware and/or software, or other implementations.

In one example, the block 102 may implement a flash media controller (FMC) in accordance with an embodiment of the present invention. The blocks 104a-104n may be implemented as a first number of flash storage devices or components. The blocks 104a-104n may be coupled to a first flash lane of the block 102. The first flash lane of the block 102 may be configured to provide independent chip enable (CE) signals to each of the blocks 104a-104n. The blocks 106a-106n may be implemented as a second number of flash storage devices or components. The blocks 106a-106n may be coupled to a second flash lane of the block 102. The second flash lane of the block 102 may be configured to provide independent chip enable (CE) signals to each of the blocks 106a-106n. Although the FMC 102 is illustrated with two flash lane instances, it will be apparent to those skilled in the art that additional flash lanes may be implemented accordingly to meet the design criteria of a particular implementation. The flash components 104a-104n and 106a-106n may be implemented as a single flash package comprising one or more dies. The flash components 104a-104n and 106a-106n may be implemented using NAND and/or NOR flash devices. The block 102 may include the appropriate physical layer support (PHY) for NAND flash and/or NOR flash.

The block 108 may implement an external FMC processor (FARM) that may be coupled to the block 102. The block 110 may implement a memory controller that may be configured to couple static random access memory (SRAM) and/or dynamic random access memory (DRAM) to the block 102. The block 112 may be implemented as one or more SRAM devices. The block 114 may be implemented as one or more DRAM devices. The block 116 may implement a double data rate physical layer (PHY) interface coupling the block 110 and the block 114. In one example, the blocks 102, 108, 110, 112, 114, and 116 may implement a system on chip (SOC) architecture.

The block 102 may be implemented as a soft IP block configured to assist various applications to use the flash devices 104a-104n and 106a-106n. As used herein, the term soft IP block generally refers to a building block of an integrated circuit that may be provided in software (e.g., HDL Code, RTL code, etc.). The block 102 generally supports multiple flash interfaces with flash devices. The block 102 does not generally include a processor (e.g., ARM). However the block 102 may implement, in one example, an interface (e.g., 32-bit AHB, etc.) configured to couple the block 102 to the external processor 108. The block 102 is generally configured to handle management of a flash media mass storage array formed by the blocks 104a-104n and 106a-106n. In one example, the block 102 may exploit a multiply-instantiated flash lane controller (FLC), which may perform most of the management functions associated with a single flash data lane with multiple independent flash components attached. The function of the block 102 may be somewhat generic in a sense that the block 102 may understand little about flash access. The block 102 is generally more concerned with weaving the flash-aware lanes into a single hardware entity. In one example, the soft IP implementing the block 102 may be parameterized to support the maximum possible lanes for an application. For example, in one implementation the number of lanes may be two. In another implementation the number may be eight.

In one example, the block 102 may support features including: (i) two flash lanes; (ii) up to eight chip enable signals (CEs) on each flash lane; (iii) flash interfaces including asynchronous normal mode, asynchronous extended mode, Toggle 1.0, ONFI 2.1, ONFI 2.3, and Toggle 2.0; (iv) dedicated ECC or shared ECC between multiple lanes that may be hardware configurable (e.g., a parameterized feature of a soft IP block implementing the block 102); (v) 8-bit data on the flash interface; (vi) up to 200 MHz DDR rate on the flash interface in the Toggle 2.0 or ONFI 2.3 flash interface specification; (vii) partial read command, (viii) random read command; (ix) CRC Strip/Insert option on flash Write/Read; (x) up to 64-bit correction for 4K bytes of data; (xi) configurable n-bit correction (max n=64) on 512, 2K, 4K bytes of data; (xii) a 32-bit AHB interface for register programming; (xiii) storage of contexts commands on external memory (e.g., DRAM or SRAM); (xiv) cut-through buffers in flash lane controllers; (xv) independent flash read and write data path to provide better performance; (xvi) in-order status reported per flash unit number (FUN); (xvii) support for one read and one write buffer controller (BC) interface for data path per flash lane; (xviii) support for read BC interface for context retrieval; (xix) support for write BC interface for context update; (xx) support for read/write BC interface for context free resource pointers (CFRP).

Figure 2:
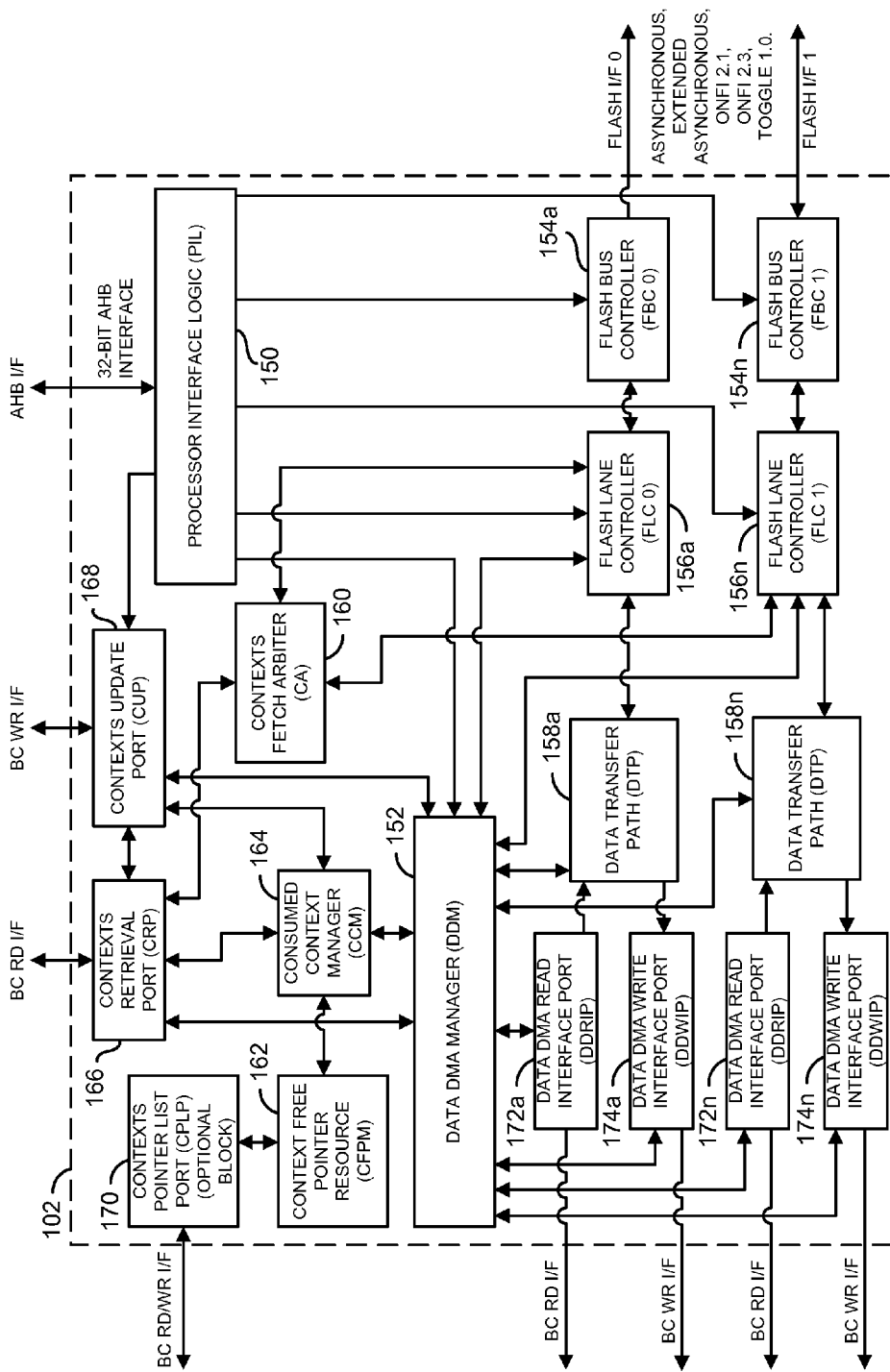
FIG. 2 is a block diagram illustrating an example flash media controller (FMC) architecture in accordance with an embodiment of the present invention.

Referring to FIG. 2, a more detailed block diagram of the block 102 of FIG. 1 is shown illustrating an example flash media controller (FMC) architecture in accordance with an embodiment of the present invention. In one example, the block 102 may implement three major functional interfaces, a buffer controller (BC) interface, a flash device interface, and a processor interface (e.g., 32-bit AHB, etc.). The buffer controller (BC) interface is illustrated on the left side and top-left of the block diagram. In one example, seven buffer controller interfaces (e.g., three read interfaces BC_RD_I/F, three write interfaces BC_WR_I/F, and one read/write interface BC_RD/WR_I/F) may be implemented. The flash device interface is illustrated on the right side of the block diagram. In one example, two flash lane interfaces (e.g., FLASH_I/F_0 and FLASH_I/F_1) may be implemented. The 32-bit AHB interface is illustrated on the top-right of the block diagram. The 32-bit AHB interface may be used, in one example, to program registers, read status and use diagnostic registers within the block 102.

The block 102 generally comprises a block (or circuit) 150, a block (or circuit) 152, a number of blocks (or circuits) 154a-154n, a number of blocks (or circuit) 156a-156n, a number of blocks (or circuit) 158a-158n, a block (or circuit) 160, a block (or circuit) 162, a block (or circuit) 164, a block (or circuit) 166, a block (or circuit) 168, a block (or circuit) 170, a number of blocks (or circuit) 172a-172n, and a number of blocks (or circuit) 174a-174n. The circuits 150 through 174a-174n may represent modules and/or blocks that may be implemented as hardware, firmware, software, a combination of hardware, firmware and/or software, or other implementations. The block 150 may implement a processor interface logic (PIL). The block 152 may implement a data DMA manager (DDM). The blocks 154a-154n may implement flash bus controllers (FBCs). The blocks 156a-156n may implement flash lane controllers (FLCs). The blocks 158a-158n may implement data transfer paths (DTPs). The block 160 may implement a contexts fetch arbiter (CA). The block 162 may implement a context free pointer resource (CFPM). The block 164 may implement a consumed context manager (CCM). The block 166 may implement a contexts retrieval port (CRP). The block 168 may implement a contexts update port (CUP). The block 170 may implement a contexts pointer list port (CPLP). The block 170 is generally optional. The blocks 172a-172n may implement data DMA read interface ports (DDRIPs). The blocks 174a-174n may implement data DMA write interface ports (DDWIPs). Together, the blocks 172a-172n and 174a-174n generally form a data DMA interface port (DDIP).

In one example, the block 150 may provide an interface from the block 108 to addressable resources of the block 102 (e.g., via an AMBA AHB-Lite interface). The block 150 may provide the interface to all addressable resources and direct interface to configuration and status registers of submodules in the block 102 that do not reside within the blocks 156a-156n. The block 150 may also provide an interface to the addressable resources that reside within the individual blocks 156a-156n. In addition, the block 150 may contain a context construction buffer (CCB), where processor firmware may write the actual media context into the block 102 for storage into the system buffer via the block 168. In one example, the block 150 may include the following features: a 32-bit AMBA AHB-Lite slave interface to the block 108, a system clock (e.g., SYS_CLK) that may be some divided value of (or the same as) an incoming clock (e.g., HCLK), access to all configuration and status registers as well as all processor-addressable space in the block 102, the context construction buffer (CCB) used by processor firmware to build contexts that are stored in the system buffer, a processor interface that is distributed to each of the blocks 156a-156n, where access of addressable resources is handled by processor access ports (PAP), and contains registers that may be used by multiple submodules in the block 102. The block 150 may perform all register decoding and all read data multiplexing for all addressable resources not stored logically in the blocks 156a-156n.

The block 152 generally manages two data transfers, one for flash program (e.g., data transaction from a buffer to a flash device) and another for flash read (e.g., data transaction from flash device to a buffer). The DMA data path generally comprises separate 32-bit read and write data busses from the blocks 156a-156n through respective blocks 158a-158n, and the data DMA interface port (DDIP) blocks 172a-172n and 174a-174n. The blocks 158a-158n may contain the ECC function. A DMA data transfer generally comprises a sequence of events that may include multiple accesses to the corresponding context by other sub-blocks (or port blocks) of the block 102. In one example, a DMA transfer may include a FLC request, a retrieve context operation, a data transfer, and a FLC done phase.

In the FLC request step, data transfer may begin with one of the blocks 156a-156n raising a respective request line. In the retrieve context operation, corresponding context may be retrieved from a buffer controller via the context retrieval port (CRP) interface 166. The data transfer may occur among the DDIP, DTP, and FLC blocks, during which the context may be sent to the DDIP and may or may not be written back. In the FLC done phase, a done line to the selected block 156a-156n may be raised to indicate the end of the transfer. The DDM 152 may act to retrieve the context and provide the inputs to the DTP block to facilitate the data transaction.

The blocks 154a-154n generally perform the low-level interface signaling to a set of NAND flash devices on a respective flash lane. There is generally one flash bus controller (FBC) 154a-154n for each flash lane controller (FLC) 156a-156n. The blocks 154a-154n generally manage the timing of each cycle of flash interface protocol for several interface types as well as different timing modes for a given type (e.g., Asynchronous, ONFI 2.0 Synchronous, ONFI 2.3 Synchronous, Samsung Toggle 1.0, Samsung Toggle 2.0, etc). Cycle timing may be controlled, in one example, via timing counts stored in a group of internal timing registers. The core logic of the blocks 154a-154n generally operates in a different clock domain than the rest of the block 102. In general, only the timing register sets reside in the same clock domain as the rest of the blocks 156a-156n. No synchronization logic is generally needed between these registers and the FBC core because the registers are treated as static since the registers are written only when the FBC is quiescent (e.g., no outstanding operations).

The blocks 156a-156n generally perform scheduling of the commands to each die. The blocks 156a-156n manage the sequencing of the commands on each respective flash lane. The blocks 156a-156n provide control and status registers through which firmware may program the die and observe the status. Each of the blocks 156a-156n include context management and die management. The blocks 156a-156n are generally responsible for the processing of the contexts.

Each of the blocks 158a-158n routes data traffic and enables flow control of each interface for data flow in between one of the blocks 154a-154n, an optional internal ECC encoder/decoder, and the respective data DMA interface port (DDIP). In one example, the internal ECC encoder/decoder may be implemented within the blocks 158a-158n. Alternatively, each of the blocks 158a-158n may be configured to share a single ECC encoder/decoder module. The blocks 158a-158n may be programmed for each transfer by both the respective data DMA manager (DDM) module 152 and respective data DMA interface port (DDIP) blocks 172a-172n and 174a-174n. Each block 158a-158n may include independent flash read and write paths, which may operate in a full duplex mode of operation. The blocks 158a-158n maintain current region counts during a data transfer as well as current dword counts within each region. The blocks 158a-158n generally perform flow control translation between the DDIP, ECC encoder & decoder, and FLC blocks. The blocks 158a-158n maintain a running correctable ECC error sum for each transfer and present a final value to the block 152 at the end of a transfer. The blocks 158a-158n may contain the FMC registers used for programming the ECC encoder & decoder. Registers may be accessed via a register interface from the block 150. The ECC module is generally capable of 64-bit correction over 4K bytes of data. However, other levels of correction may be implemented accordingly to meet the design criterial of a particular implementation. In one example, a decoder gate count may be 415K gates and an encoder gate count may be 75K gates.

The block 160 is generally responsible for accepting requests for contexts from the blocks 156a-156n, retrieving the requested contexts from the system buffer (e.g., the DRAM accessed through the buffer controller), then delivering the contexts to the blocks 156a-156n. The retrieval may actually be performed via request to the context retrieval access port (CRP) 166. Contexts are the basic unit of control in the FMC. Contexts generally contain all the information needed by an FLC to execute a command and by the FMC to perform the associated data transfer (DMA) to or from the system buffer. The FLCs act completely autonomously; thus, the FLCs require arbitration for access via the buffer controller to the system buffer, which contains the linked lists of contexts built by the firmware. The block 160 generally provides the arbitration, as well as initiating the request to the block 166. The block 160 then routes the retrieved contexts transparently to the respective FLC destinations. The block 162 is generally implemented as a sub-block of the block 102 to provide a single point where the free pointers are available to firmware.

The block 164 is generally implemented as a sub-block of the block 102 to provide a single point where completed contexts may be inspected by firmware after completion. The block 164 generally performs arbitration among multiple FLC sources. The FLCs provide PASS/FAIL ECC status associated with the context pointer. The block 164 updates the context status field once the context is fetched, then presents the context to the firmware. In the case where the firmware takes a longer time to read the completed contexts and the internal memory within the block 164 is about to become full, the block 164 may use a buffer to store the completed contexts that are enqueued after the current reported context.

The blocks 166-174n generally implement a port interface. The port interface may be used to communicate with the buffer controller. In one example, a QBFIFO block may be implemented within the port interface. The following port interfaces may be implemented also as part of the port interface: contexts retrieval port (CRP) 166, contexts update port (CUP) 168, contexts pointer list interface port (CPLIP) 170 (optional), data DMA read interface port (DDRIP) 172a-172n, and data DMA write interface port (DDWIP) 174a-174n. In one example, the interface signals of the block 102 may be grouped into four major interfaces: a AHB interface, a buffer controller interface, a NAND and/or NOR flash physical layer (PHY) interface, and a miscellaneous (MISC) interface. The buffer controller interface may comprise (i) DDIP BC write interfaces for lane 0 & lane 1, (ii) DDIP BC read interfaces for lane 0 & lane 1, (iii) a CRP BC read interface, (iv) a CUP BC write Interface, and (v) a CPLIP BC read/write interface.

In one example, the block 102 may be implemented with three clocks. The majority of the logic in the block 102 may operate on a clock domain called system clock (e.g., SYS_CLK). The system clock may be the AHB clock. The system clock generally has a frequency that may be one-half of the operating frequency of the FMC Processor (FARM) 112. The second clock may be called the flash clock (e.g., FBC_CLK). The flash bus controllers (FBCs) 154a-154n may operate completely on the flash clock domain. In one example, first-in first-out buffers (FIFOs) may be implemented in a Dataflow Manager (DM) module of the blocks 154a-154n to manage the frequencies between the clocks FBC_CLK and SYS_CLK. The third clock may be the buffer controller clock (e.g., BC_CLK). All interface ports with the BC are operating on the buffer controller clock domain. A buffering element (e.g., QBFIFO) may be implemented between the buffer controller clock BC_CLK and the system clock SYS_CLK.

Figure 3:
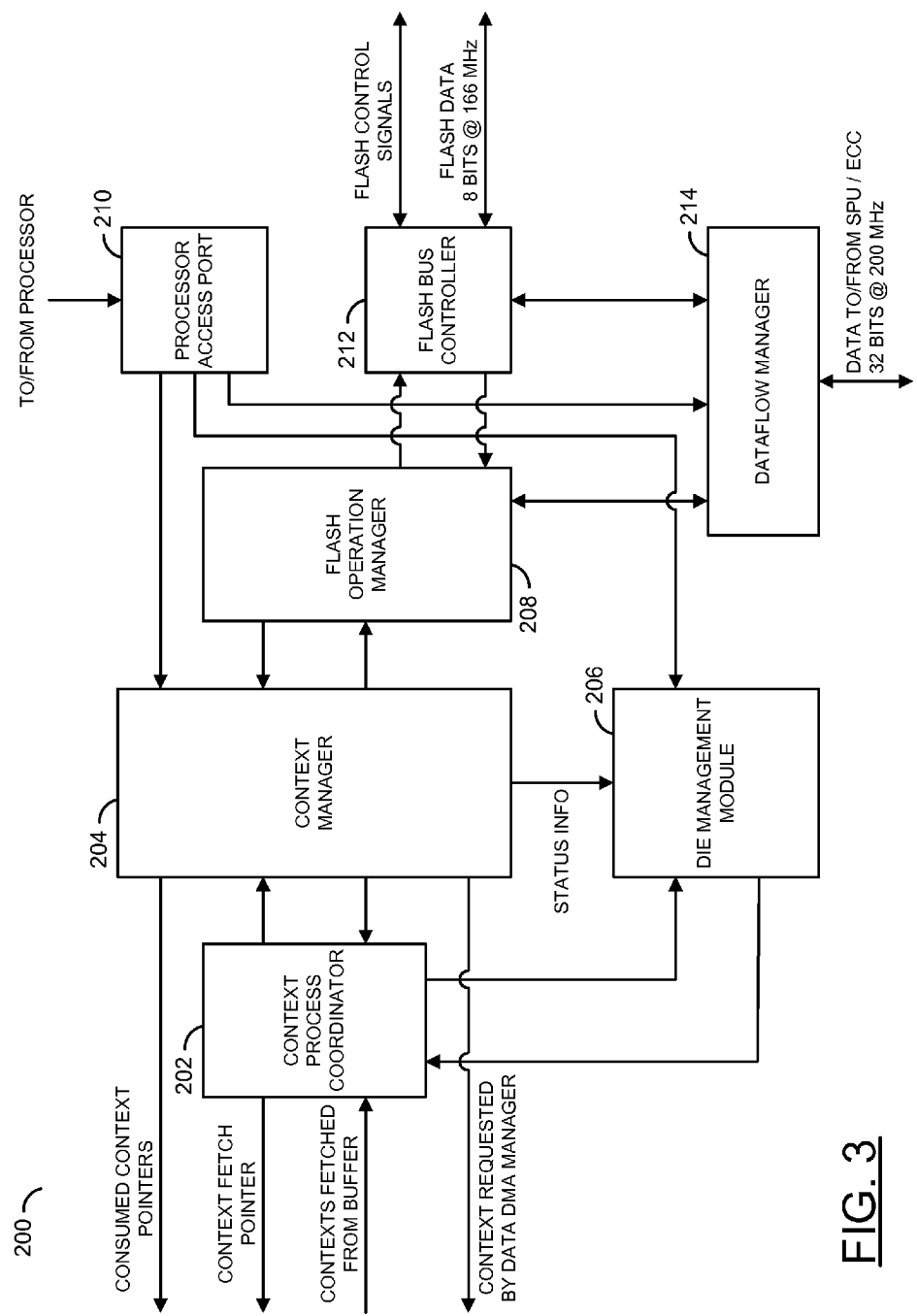
FIG. 3 is a block diagram illustrating an example flash lane controller architecture in accordance with an embodiment of the present invention.

Referring to FIG. 3, a diagram of a block 200 is shown illustrating an example flash lane controller architecture in accordance with an embodiment of the present invention. The block 200 may be used, in one example, to implement the blocks 154a-154n and 156a-156n in FIG. 2. In one example, the block (or circuit) 200 may comprise a block (or circuit) 202, a block (or circuit) 204, a block (or circuit) 206, a block (or circuit) 208, a block (or circuit) 210, a block (or circuit) 212, and a block (or circuit) 214. The circuits 202 to 210 may represent modules and/or blocks that may be implemented as hardware, firmware, software, a combination of hardware, firmware and/or software, or other implementations. The block 202 may implement, in one example, a context process coordinator (CPC). The block 204 may implement, in one example, a context manager (CM). The block 206 may implement, in one example, a die management module (DMM). The block 208 may implement, in one example, a flash operation manager (FOM). The block 210 may implement, in one example, a processor access port (PAP). The block 212 may implement, in one example, a flash bus controller (FBC). The block 214 may implement, in one example, a data flow manager (DFM).

The block 202 may assist in the flow of context information into and out of the block 200. Context flow may be initiated by the block 204. The block 202 is primarily concerned with responding to the requests to acquire or dispose of contexts. To acquire contexts, the block 202 responds to the request for a new context by the block 204. First, the block 202 may initiate a request to the block 206, which arbitrates among the die managed by the block 200 and forwards the context for the selected die or logical unit number (LUN) to the block 202. The block 202 then issues a fetch to the context fetch arbiter (CFA) (e.g., block 160 in FIG. 2), which attempts to retrieve the context from the system buffer.

Once fetched, the context is delivered to the block 202. The block 202 performs some interpretation on the context and forwards the context to the block 204. If the block 206 does not have a die (LUN) available to initiate a context execution, the block 206 informs the block 202 of the lack of an available die, and the block 202 communicates the lack of an available die back to the block 204. The block 202 also assists the block 200 in the disposal of completed contexts. Again, it is the block 204 that initiates this flow, and the block 202 that issues the disposal message to the block implementing the consumed context manager (CCM) (e.g., block 164 in FIG. 2). When the disposal message has been received and acted upon by the CCM, the block 202 informs the block 204, which may then continue context process execution.

The block 202 generally performs some interpretation of the contexts. Specifically, the block 202 may interpret contexts for the purpose of determining whether a context is a Processor Control Mode (PCM) context. When a PCM context is received, context fetching (appending) should cease. The block 202 then waits for the block 204 to begin executing the PCM context and resumes "standard" operation when the processor control mode is completed. During the processor control mode interval, the block 202 determines whether fetched contexts are full 15 dword contexts instead of 4 dword flash contexts, which the block 202 sends to the block 204 in "standard" operation.

The block 204 may, in one example, comprise a context state machine (CSM), a context fetch manager (CFM), a context disposal engine (ODE), and a context interpreter (CI). The block 204 is generally responsible for managing the contexts that are actively being processed by the block 200. The block 204 generally performs the "bookkeeping" of active contexts. Contexts are data structures that provide all the information needed by the flash media controller (FMC) to execute flash transactions and DMAs to the system buffer. The block 204 manages the contexts at the level of the flash lane controller and thus is primarily concerned with the context management as it relates to the flash transaction. The block 204 maintains the information used by the block 208 to perform commands and data transfers to the flash dies on the flash lane.

The block 206 is generally responsible for maintaining die-based information needed for operation of the block 200. The block 206 manages per-die information in the die management table and arbitrates among the dies for access to be queued to the context table. The block 206 may include, in one example, a die state machine to update a die state. The block 206 may perform/monitor multi-die operations. The block 206 is generally responsible for flash commands including, but not limited to READ, COPYBACK READ/ COPYBACK WRITE, BLOCK ERASE, PAGE PROGRAM, and Target level commands including, but not limited to READ ID, READ PARAMETER PAGE, GET FEATURES, SET FEATURES, SYNCHRONOUS RESET, and RESET.

The block 208 generally handles the sequencing of each flash operation applied to the flash lane. One block 208 is generally implemented for each flash lane controller (FLC) of the flash media controller. The block 208 arbitrates between the commands in the context table in the block 204, and applies the commands to the block 212. In one example, the block 208 natively supports the most common commands from the ONFI 2.0 command list, as well as some specific (and similar) commands found in the Samsung NAND flash devices. In addition, other existing and future commands may be supported via a nano-sequencer (described in more detail below in connection with FIGS. 9-11). Natively supported commands are run without processor intervention, but other commands generally use some level of processor support.

The flash commands may be broken down into atomic "cycles" that may be applied serially to the actual flash dies controlled by the block 208. Because the flash commands typically involve long wait times (e.g., a page read may take 25 μs before the data are available to be read from the chip), the "command cycles" may often be run "back to back" to different die on the flash lane, thus cutting down the effective, cumulative wait times. The block 208 generally manages the flash die by updating the status of the die as each flash "cycle" is applied. The block 208 then reads the updated context table to decide what "cycle" should be (or can be) executed next. A NAND flash operation generally consists of one or more flash cycles. There are generally four types of flash cycles: Command, Address, Data Output (w.r.t. flash device—e.g., a read), and Data Input (w.r.t. flash device—e.g., a write). The cycle types roughly translate to the operation types defined between the block 208 and the block 212.

The block 210 generally implements an interface block that provides processor access from the AHB-Lite slave interface of the FMC 100 to the addressable resources inside the block 200. Most of the resources addressed here are accessible primarily for diagnostic purposes, as all configuration signals are presented at the global level (as part of a shared configuration registers block). For example, full access to the flash lane data buffers may be available through the block 210. The access may be provided purely as an early verification scaffold. However, access to the flash lane data buffers may also support firmware patches that need direct access to internal tables. Such accesses may be provided through the block 210.

Features of the block 210 may include: a simple access interface that follows the AHB-Lite slave protocol and is buffered by the Processor Interface Logic (PIL) in the FMC; read and write access provided to register resources, context table, context cache, and die management table; read and write access provided to the flash lane data buffer memory resource, located in the block 214. The block 210 generally supports an ability to add per-lane configuration registers, though most configuration registers are generally provided as inputs to the block 200. Similarly, status and interrupt register access may be supported, though most status and interrupt registers are generally generated outside the block 200. The primary logic groups of the block 210 may include: Interface Manager (IF_MGR), Dataflow Manager Interface (DM_IF), Register Block Decoder (REG_DEC), Register Block Multiplexer (REG_MUX), Interrupt Handler (INT_HND), and FLC Global Registers (GLOB_REGS).

Figure 4:
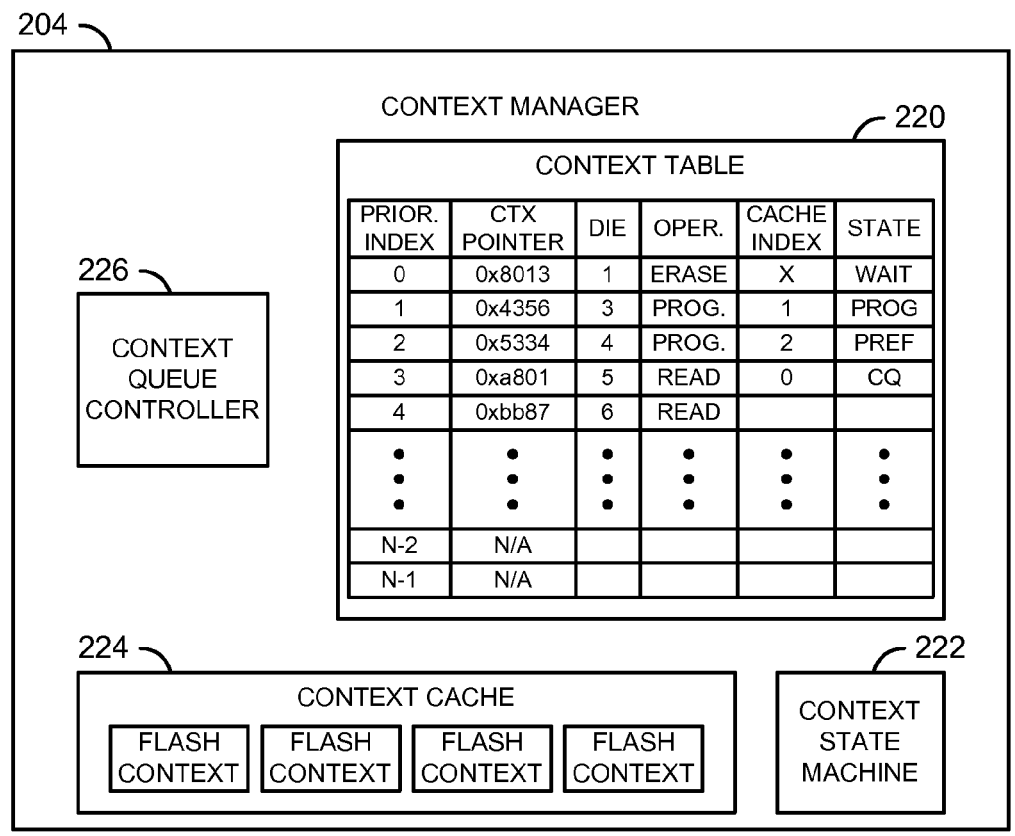
FIG. 4 is a diagram illustrating example submodules of the context manager module of FIG. 3.

Referring to FIG. 4, a diagram is shown illustrating sub-modules of the context manager module 204 of FIG. 3. In one example, the block 204 may include a context table (CT) 220, a context state machine (CSM) 222, a context cache (CC) 224, and a context queue controller (CQC) 226. The block 204 generally stages and executes phases of operation on the flash lane controller, maintains the priority ordering of all active contexts on the flash lane, maintains the state of each context on the flash lane, provides (e.g., via the context cache) the minimum amount of temporary on-chip storage of contexts needed to execute full transactions, maintains the buffer pointer of each context that is in the process of being executed, and provides agency for each context by determining the next state of the context using the context state machine (CSM) 222. Minimal context information may be maintained in the context table (CT) 220. The context table 220 generally provides a priority queue of contexts currently being executed. The context queue controller (CQC) 226 may be configured to remove completed contexts from the context table 220 and compress the context table 220 to eliminate gaps.

Figure 5:
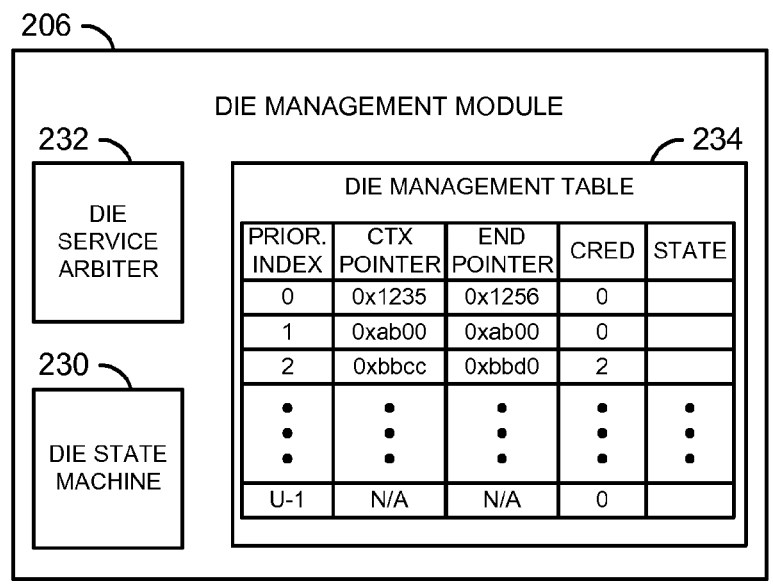
FIG. 5 is a diagram illustrating example submodules of the die management module of FIG. 3.

Referring to FIG. 5, a diagram is shown illustrating sub-modules of the die management module 206 of FIG. 3. In one example, the block 206 may comprise, a die state machine 230, a die service arbiter 232, and a die management table 234.

Figure 6:
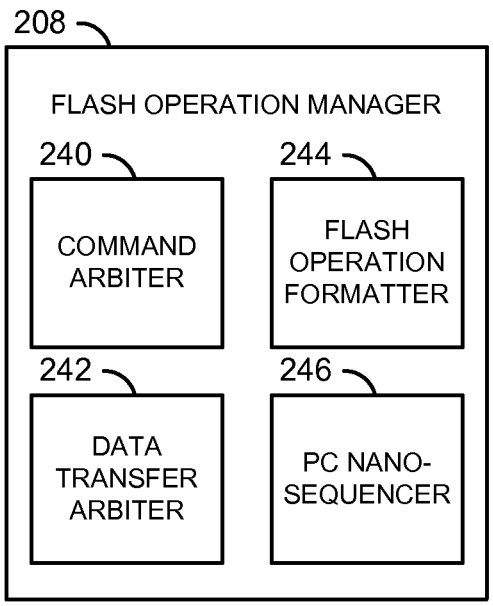
FIG. 6 is a diagram illustrating example submodules of the flash operation manager module of FIG. 3.

Referring to FIG. 6, a diagram is shown illustrating sub-modules of the flash operation manager (FOM) 208 of FIG. 3. In one example, the block 208 may be divided into four submodules, a command arbiter (CA) 240, a data transfer arbiter (DTA) 242, a flash operation formatter (FOF) 244, and a nano-sequencer 246. The command arbiter 240 generally scans the context table for the commands to apply, and then communicates with the flash operation formatter (FOF) 244 to send the signals to the flash buffer controller (FBC). Once all of the "command" portions have been run, and the flash is ready for a "data phase", the data transfer arbiter 242 initiates a transfer between the FBC and the dataflow manager (DM) 214. Finally, the nano-sequencer 246 interprets special "soft contexts" to apply any command sequence that a flash may require, even if the command sequence is not natively supported.

Figure 7:
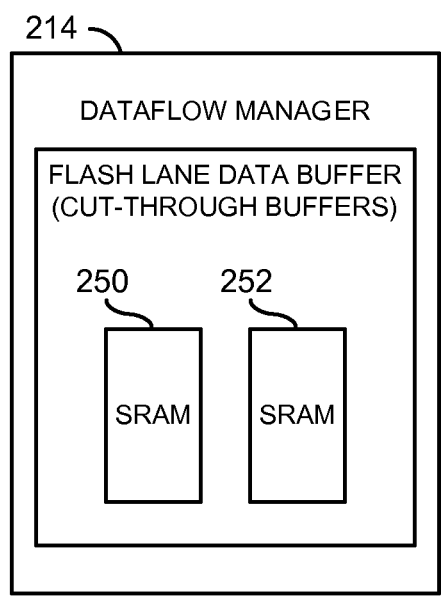
FIG. 7 is a diagram illustrating example submodules of the dataflow manager module of FIG. 3.

Referring to FIG. 7, a diagram is shown illustrating sub-modules of the dataflow manager 214 of FIG. 3. The dataflow manager 214 generally provides flash lane data buffer memory resources. In one example, the flash lane data buffer memory resources may comprise cut-through buffers 250 and 252. In one example, the cut-through buffers 250 and 252 may be implemented with a size that is programmable. For example, the size of the buffers 250 and 252 may be adjusted to match bandwidth specifications. In one example, the buffers 250 and 252 may comprise static random access memory (SRAM). However, other types of memory maybe implemented accordingly to meet the design criteria of a particular implementation. In general, two cut-through buffers are implemented per flash lane.

Figure 8:
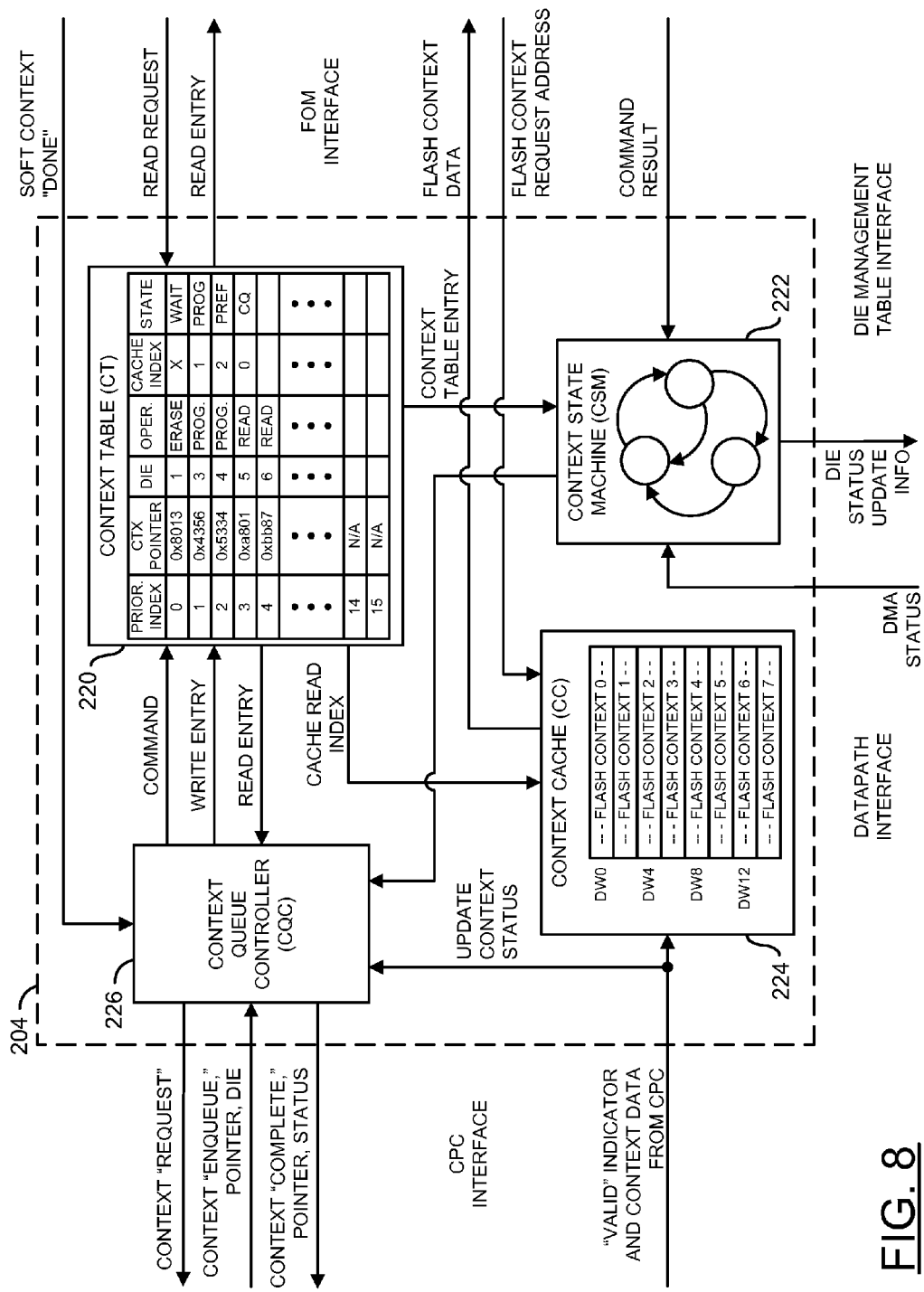
FIG. 8 is a diagram illustrating an example implementation of the context manager module of FIG. 3.

Referring to FIG. 8, a diagram is shown illustrating an example implementation of the context manager (CM) 204 of FIG. 3. The context manager (CM) 204 is generally responsible for managing the contexts that are actively being processed by the respective flash lane controller (FLC). The CM 204 generally performs the "bookkeeping" of active contexts. As stated previously, contexts are data structures that provide all the information used by the flash media controller (FMC) 102 to execute flash transactions and DMAs to the system buffer. The CM 204 manages the contexts at the level of the FLC and thus is primarily concerned with the context management related to the flash transaction. The CM 204 maintains the information used by the flash operation manager (FOM) to perform commands and data transfers to the flash dies on the flash lane.

The CM 204 is generally configured to (i) stage and execute phases of operation on the respective flash lane controller, (ii) maintain priority ordering of all active contexts on the respective flash lane, (iii) maintain the state of each context on the respective flash lane, (iv) provide the minimum amount (or minimize the amount) of temporary on-chip storage (e.g., via the context cache 224) of contexts used to execute full transactions, (v) maintain the buffer pointer of each context that is in the process of being executed, (vi) provide agency for each context by determining the next state of the context using the context state machine (CSM) 222, and (vii) maintain minimal context information in a priority queue of contexts currently being executed (e.g., the context table 220). The context queue controller 226 is generally configured to remove completed contexts from the context table 220 and compress the context table 224 to eliminate gaps.

The context queue controller (CQC) 226 is the logic block that performs modifications on the context table (CT) 220. The CT 220 may be implemented, in one example, as a block of registers that is organized into one entry per enqueued context. The CQC 226 is the block that performs the operations on the table, which is organized as a priority queue. The CQC 226 generally initiates and executes context processes and is responsible for executing the processes on the context table. The main processes generally include Append, Wait, Modify, Dispose, and Compress. The processes are staged and executed by the CQC 226.

The append phase is the phase in which new contexts are fetched by the FMC, and entries for those contexts are added to the context table 220. The CQC 226 inspects the contents of the flash context and the context information presented by the CPC 202 and appends and creates an entry based on the contents and context information. In one example, the context table entry may comprise a bit (or flag) indicating whether a context table entry is active, a value representing the context state, a value representing the context cache index, a value presenting the flash operation, a value representing the flash die, a context pointer, a bit (or flag) indicating whether to disable data transfer and a value representing a plane address. New entries generally begin with the "active" bit set (e.g., a logic '1') and the "context state" set to a value "QUEUED." If the flash operation is illegal, the initial state may be set to a value "ILLEGAL," and the context table entry may be removed during the disposal phase. The other fields are generally determined by the context and the information provided by the CQC 226. New entries are generally appended to the tail of a compressed context table 220. Thus, the CQC 226 is generally aware of the depth of the context table 220.

The CQC 226 generally exits the "append" phase when the CQC 226 is no longer waiting for outstanding data transfers to complete and the CQC 226 has attempted at least one append operation during the given flash operation cycle. The CQC 226 may also leave the "append" phase when there is no longer any space available in the context table 220 or the context cache 224.

The context manager 204 may or may not be forced to wait between full flash operation cycles. The context manager 204 generally has the ability to enforce a minimum flash operation period (e.g., via a flash operation period register). Such a minimum period is desirable for cases where, for example, the flash lane is largely idle except for polling after PROGRAM or ERASE commands. In such instances, the context phases take a very short time to execute, as there are no appends or disposals. Thus, there would be a tendency for the lane to exist in a state where the lane is continuously polling flash die that are busy, thereby consuming power on the flash interface when that power consumption is not warranted. The CQC 226 generally remains in the wait phase until a predetermined time has expired (e.g., a time may be specified in a "flash operation timer" register). When the predetermined time has expired, the CQC 226 may enter the "modify" phase.

The next phase initiated by the CQC is generally the "modify" phase. In the modify phase, the context table 220 is modified based on flash operations performed by the flash operation manager (FOM) and also by results from datapath transfers. The updates are generally related to the state of the context and are thus generally initiated by the context state machine (CSM) 222. When a state update occurs, the CSM 222 sends the updated state and context table index to the CQC 226. The CQC 226 then updates the entry in the context table 220. The modify phase ends when the FOM is done with its cycle of flash interface processes. The FOM may inform the context manager 204 that the flash interface processes are done by asserting a signal (e.g., FOM_CM_FLASH_PROC_CMPLT). Once the modify phase has completed, the CQC 226 may perform the disposal, compression, and appending of contexts on the context table 220. During this time, the context table 220 is inaccessible to the FOM. The CQC 226 may enforce the context table 220 being inaccessible to the FOM by deasserting a signal (e.g., CM_FOM_CT_VALID) indicating to the FOM that the context table read entry and the context cache read data are valid during the particular clock cycle.

When the modify phase has completed, the CPC 202 initiates the "disposal" action. The disposal action puts the CQC 226 into a mode where the CQC 226 searches the context table 220 looking for entries that have completed execution. The CQC 226 bases the decisions of whether entries have completed execution on the states of the contexts. When the contexts are in a "completed" state, the context may be disposed of by the CQC 226. In one example, a context may be in a state in which the CQC 226 is awaiting notification from the datapath as to the completion status of the context. For example, in the case of a READ operation, the context may be in the DATA_TRANSFER_DONE state and awaiting the result of the ECC check. In this case, the CQC 226 may temporarily suspend the disposal process and wait for the status to be returned from the datapath. During this time, the CQC 226 may allow "appends" to occur. Once the awaited status is returned, however, the context may be disposed of by the CQC 226, and the consumed context record may be forwarded to the CPC 202 (and ultimately to the consumed context manager (CCM) 164).

When the CQC 226 has disposed of a context, the CQC 226 clears the "active" bit for the corresponding entry in the context table 220. The process continues until the CQC 226 has reviewed every context in the context table 220. When the CQC 226 reaches the end of the active contexts in the context table 220, the disposal phase is completed.

Contexts that have been disposed of by the CQC 226 have the "active" bits in the respective table entries cleared. Without a mechanism to shift the table up to fill in the holes, the active entries would become disbursed (or fragmented) in the context table 220. Disbursed contexts would make the context table difficult to scan and make the "append" phase more complicated. To ensure that the context table 220 maintains its character as a priority queue, the context table 220 may be compressed. In the compression process, when the CQC 226 disposes of a context, the CQC 226 immediately shifts all the entries after the freed entry up by one position. When the process is complete, all of the active entries are at the front of the list in priority order and all of the "holes" have been removed. As is the case with other actions, the CQC 226 asserts a "done" semaphore (or bit) when the compression process is finished. At the end of the last compress phase, the CQC 226 may start the append phase.

The CQC 226 is generally aware of the processor control mode. In the processor control mode, the entire CM 204 suspends standard operation and proceeds in a mode where the operation of the FLC is essentially driven by "soft contexts" that are executed by the nanosequencer 246 inside the flash operation manager 208. The soft contexts are a different size from the standard flash context. In one example, soft contexts may comprise a full fifteen 32-bit double-words, whereas "flash contexts," the portion of the full media context executed by the FLC, generally comprise just four 32-bit double-words.

The processor control mode (PCM) generally begins when a context whose "flash operation" field is set to PROCESSOR_CONTROL_MODE appears at the top of the context queue. In general, there should be no active entries behind the PCM context in the context table 220, as the CQC 226 should suspend retrieval of standard contexts once the CQC 226 enqueues a PCM context. When the PCM begins, the CQC 226 may notify the CPC 202 via a signal (e.g., CM_CPC_PROC_CNTL_MODE). In response to the notification, the CPC 202 may fetch the "soft context" found at the location given in the PCM context. From the standpoint of what is presented to the FOM, the FOM generally has no knowledge of the existence of the PCM context in the context table 220 while the PCM context is behind other active entries in the context table 220. The PCM context entry in the context table 220 presents its "active" bit to the FOM as 0 until the CM 204 is ready for the FOM to begin executing the soft context.

When the FOM begins reading the soft context, the CQC 226 snoops the operations as the operations are presented to the FOM 208 by the context cache 224, where the soft contexts are stored. When an operation involves a DMA context (e.g., Prefetch Data, Set Read Data Buffer, or Dispose of Context Pointer), the CQC 226 co-opts the now-unused storage in the context table 220 and places the pointers in the context table for tracking. When those DMA contexts complete, the FOM 208 notifies the context manager 204, which then disposes of the contexts in the standard fashion.

While snooping, the CQC 226 also looks for "Fetch Next Soft Context" operations. When the CQC 226 finds one, the CQC 226 asserts a signal (e.g., CM_CQC_PCM_NEXT_CONTEXT) to the CPC 202, which fetches the next soft context. When the FOM 208 informs the CM 204 that the soft context execution is complete, the FOM 208 informs the CM 204 on the FOM/CM command interface. The CQC 226 then deasserts a signal (e.g., CM_CPC_PROC_CNTL_MODE) to the CPC, and standard operation continues. In one example, the signal CM_CPC_PROC_CNTL_MODE may be asserted as a level to indicate that the CM 204 has entered the processor control mode and is now ready to receive soft contexts.

Another important function of the CQC 226 is to monitor timeout situations. In one example, the CQC 226 may contain a counter configured to count the number of system clock (SYS_CLK) cycles that the same context table entry has resided at the top (e.g., at entry 0) of the context table 220. If the count value reaches the value of a programmable "timeout" counter, the entry at the top of the context table 220 may be considered to have timed out. When an entry is considered to have timed out, the entry may be removed from the context table 220, and the context pointer returned to the context process coordinator (CPC) 202 on the consumed context interface.

The return status for the context is one of two possible "timeout" statuses. In the first case, the timeout could potentially be due to a situation where another die on the flash lane is busy and is driving down the R/B line. In this case, the status indicates that the timeout could be due to a timeout on another die. In the second case, the die for the context is known to be the culprit. Here, a different status may be returned indicating that the die is the culprit.

The context table 220 is essentially the storage medium of the entries. The depth of the context table is parameterizable. For example, in the case of a chip that can support 16 die per lane, sixteen entries may be implemented. If more than one operation may be managed per die, increasing the depth may be advantageous. The context table 220 has minimal function. Most of the more involved processing on the context table 220 is performed by the CQC 226. However, the context table 220 may be implemented with multiple read interfaces and multiplexing logic for each of the read interfaces. In one example, the context table 220 may be implemented with an interface to the FOM 208 and an interface to the context state machine (CSM) 222 for read accessibility. The context table 220 also may have a read interface to the CQC 226. The context table 220 may be accessed by the processor, as well.

The context table 220 also has the "shift" capability that is used for the compression phase of the table. Aside from that, the CQC 226 may update the context table 220 using a simple write interface. In one example, the context table 220 may be implemented in flip-flops. When the context table 220 is implemented in flip-flops, there is no arbitration required for read access. If the context table 220 increases in size beyond about 1000 flip-flops, the context table 220 may be implemented in a register file or an SRAM, but additional management and access arbitration should also be implemented.

The context cache 224 is another context data storage element similar to the context table 220. The context cache 224 generally contains a parameterizable number of entries. In one example, the number of entries may be eight. However, other numbers of entries may be implemented to meet the design criteria of a particular implementation. For example, the number of entries may be set to one or two more than is actually needed for fully-pipelined operation. The number should generally be set large enough to allow enough space for full "soft contexts" in the processor control mode. As mentioned above, a full context may comprise fifteen 32-bit double-words. A subset of the full media context is referred to as the "flash context." The flash context is generally the first four double-words (or dwords) of the full media context. The four dwords of the flash context generally contain all the information used by the FLC to execute the full operation specified by firmware. During standard operation (e.g., when the FLC is not in the processor control mode), only the first two dwords of the flash context are stored in the context cache 224. The remainder of the flash context is generally stored in the context table 220.

The context cache 224 generally maintains status on each entry. In one example, the status may comprise a bit indicating whether the entry is FREE or USED. In one example, eight such bits may be implemented in the context cache 224. When a flash context is written to a location in the context cache 224, the status of the location becomes USED. When the CQC 226 receives information on a state change that allows that location to clear, the state of the location returns to FREE. During standard operation, the context cache 224 notifies the CQC 226 that the context cache 224 has space for a free entry based on the status bits. If there is a free location, the CQC 226 is free to request a context from the CPC 202. When the CPC 202 has fetched a new flash context, the CPC 202 presents the flash context to the context cache 224 as a burst of 32-bit double-words of data. A signal (e.g., CPC_CM_ENQ_CTX_VALID) may be asserted when the data is valid. The context cache 224 writes the data into the free location. The context cache 224 expects that the CPC 202 will only write one flash context.

In the processor control mode, which is entered when the entry at the top of the context table 220 is indicated as a PROCESSOR_CONTROL_MODE operation, the context cache 224 should be completely free. In the processor control mode, the context cache 224 should expect to receive a soft context from the CPC 202. The context cache 224 may also expect the soft context to include 15 dwords. Essentially, the context cache 224 acts as a slave, accepting any data presented by the CPC 202. It is the responsibility of the CPC 202 to write the proper amount of data to the context cache 224. The context cache 224 is accessible by the FOM 208, which uses the full flash context information when performing the actual command on the flash unit. The FOM 208 provides an address to a 32-bit double-word, and the context cache 224 responds with the requested double-word on the following clock cycle. During the processor control mode, read responses from the context cache 224 are snooped by the context queue controller (CQC) 226, which may perform actions based on the contents of the operations. The context cache 224 may also be accessible by the processor interface, as is the context table 220.

The context state machine (CSM) 222 is generally configured to determine the execution state of each context in the context table 220 based on the current state of the entry and either the operation being performed by the FOM 208 or the status of a datapath operation. In the modify phase, the CSM 222 is called by the CQC 226 every time the FOM 208 applies a command or returns a result. The contents of the FOM command notification interface and the FOM context table read interface generally provide all the information needed for the CSM 222 to determine the next state.

In the dispose phase, the CSM 222 is called by the CQC 226 when the CQC 226 scans the context table 220 and encounters a context table entry that is in a state in which the context table entry is awaiting action (e.g., a TRANSFER_DATA state or a PREFETCH_DATA state). When the TRANSFER_DATA state or the PREFETCH_DATA state is encountered, the CQC 226 awaits information from the datapath (e.g., either the DM, the DDM, or the DTP) regarding the status of the data transfer. Either way, the CSM 222 is generally called to determine the next state for the context table entry in question. The CSM 222 is also responsible for notifying the die management module 206 when a context table entry moves to a completion state (e.g., COMPLETED or COMPLETED WITH ERROR).

Figure 9:
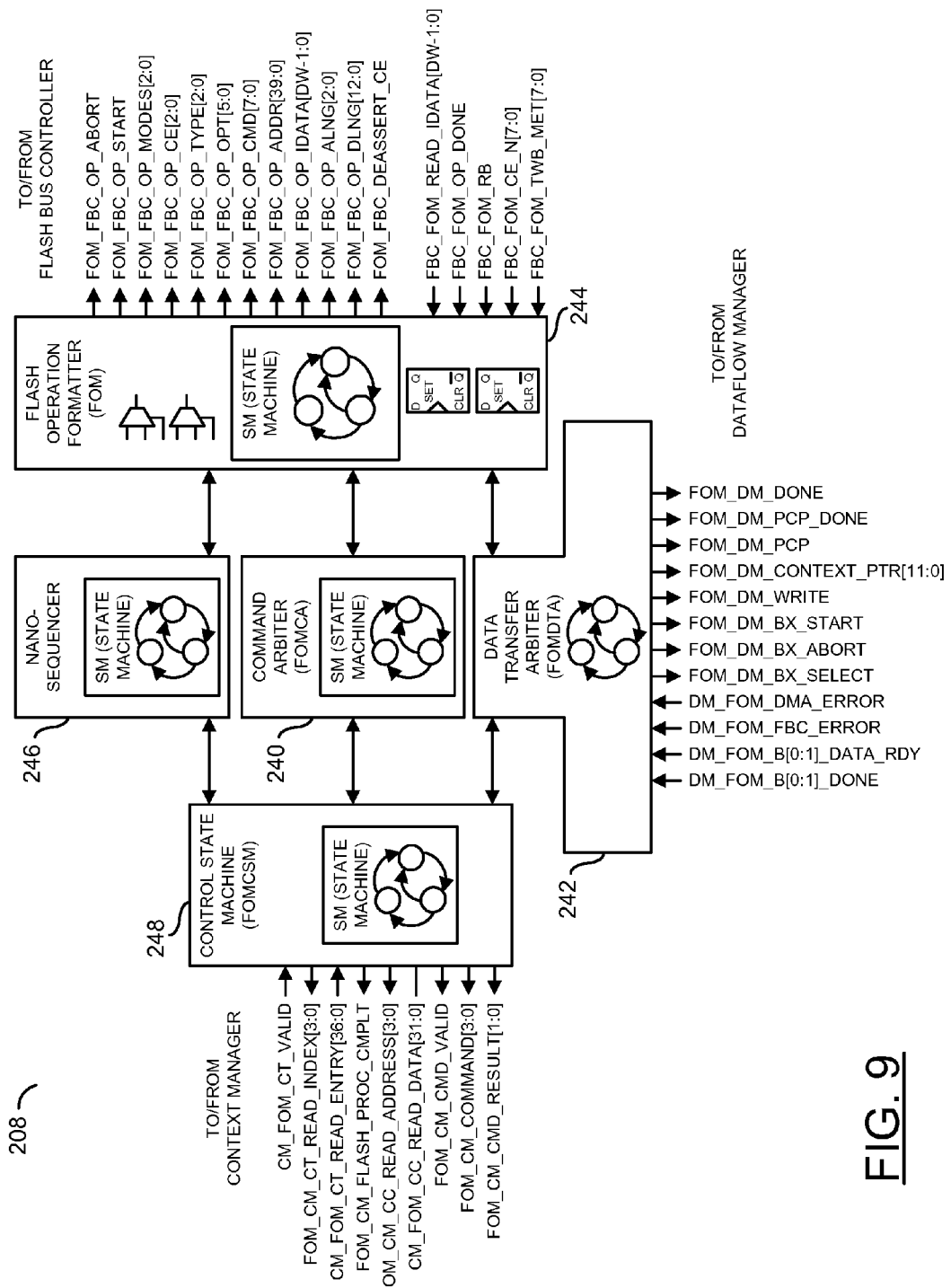
FIG. 9 is a diagram illustrating an example implementation of the flash operation manager of FIG. 3.

Referring to FIG. 9, a block diagram is shown illustrating an example implementation of the flash operation manager 208 of FIG. 6. In one example, the block 208 maybe implemented with five submodules. For example, the block 208 may comprise the block (or circuit) 240, the block (or circuit) 242, the block (or circuit) 244, the block (or circuit) 246, and a block (or circuit) 248. The circuits 240 through 248 may represent modules and/or blocks that may be implemented as hardware, firmware, software, a combination of hardware, firmware and/or software, or other implementations. The block 240 may implement, in one example, a command arbiter (CA). The block 242 may implement, in one example, a data transfer arbiter (DTA). The block 244 may implement, in one example, a flash operation formatter (FOF). The block 246 may implement, in one example, a nanosequencer. The block 248 may implement, in one example, a control state machine (FOMCSM).

The data transfer arbiter 242 generally connects the flash operation manager 208 to the dataflow manager 214. The flash operation formatter 244 generally couples the flash operation manager 208 to the flash bus controller 212. The control state machine 248 generally couples the flash operation manager 208 to the context manager 204. The command arbiter 240 is generally connected between the flash operation formatter (FOM) 244 and the control state machine 248. The data transfer arbiter 242 is generally coupled between the flash operation formatter 244 and the control state machine 248. The nanosequencer 246 is generally coupled between the flash operation formatter 244 and the control state machine 248. The command arbiter 240 generally scans the context table in the context manager for the commands to apply, and then communicates with the flash operation formatter (FOF) 244 to send the signals to the flash buffer controller (FBC).

Flash media controller (FMC) hardware automation features may be optimized to only those commands needed to attain maximum performance. The intent of this optimization is to simplify the hardware automation and simplify the firmware design while providing interoperability with existing flash devices. However, the hardware is not restricted to issuance of only those commands needed to attain maximum performance. On the contrary, the hardware may be directed by firmware to perform almost any atomic operation that may be performed on flash, and firmware may assume direct control of the hardware resources built into the FMC to facilitate the control of the flash and the movement of data. A mode where the firmware assumes direct control of the hardware resources built into the FMC is generally referred to as the processor control mode (PCM).

The processor control mode (PCM) may be used to apply "soft" commands (e.g., commands that are not natively supported by the hardware) to flash units. In general, the processor control mode is only visible to the flash lane controller (FLC). The logic outside of the FLC is generally completely oblivious to the processor control mode of operation and supports the FLC in the same fashion regardless of whether the processor control mode has been entered.

The manner in which "soft" commands may be applied is through the creation and presentation of "soft" contexts. A soft context as used herein generally refers to a context whose "Flash Operation" field is set to a value (e.g., PROCESSOR_CONTROL_MODE) associated with the processor control mode. Setting the flash operation field to the PROCESSOR_CONTROL_MODE value generally places the FLC into a mode where the FLC attempts to store the entire context (instead of just the "flash context" subset as is normally done) and finishes executing any outstanding contexts in the context table of the FLC. The FLC then suspends normal hardware automation of the FLC, and issues directives from the doublewords in the remainder of the context, each double-word representing an operation to be performed, for example, by the nanosequencer 246.

The basic flow for a PCM command may be as follows:
1. Initially the FMC is in a normal operational mode. In the normal operational mode, each FLC may have multiple contexts queued up to each of the die that it supports. The first 1-2 of these contexts for each die may be prefetched into the FLC for execution.
2. The firmware may insert a PCM context at the end of a linked list for one of the die supported by a particular flash lane controller. The firmware may continue to insert other contexts after the PCM context in the linked list of the die or in respective lists of other dies supported by this or any of the FLCs. A PCM context has a Flash Operation code set to PROCESSOR_CONTROL_MODE and the flash row address field of the context provides a 16-bit context pointer to the first "soft" context. In one example, all other dwords of the PCM context may be treated as reserved fields.
3. The PCM context is eventually fetched into the FLC. At this moment, the respective FLC enters PCM mode and stops fetching new contexts into the FLC. All other FLCs are not affected and continue to fetch and execute the respective die lists as normal.
4. The FLC with the PCM context now waits until all previously fetched contexts for die supported by the FLC have completed execution so only the PCM context is left in the respective FLC.
5. The flash row address field of the PCM context is used as a context pointer to fetch the first "soft" context into the FLC. A "soft" context is the same size as a normal context, but each of the 15 dwords may contain a "soft" command that may be executed by the nanosequencer 246 in order from dword-0 to dword-15.

6. Some of the "soft" commands may reference other "PCM DMA" contexts that are prepared in the buffer. The "PCM DMA" contexts are loaded into the FMC by the "soft" commands to cause data transfer to occur between the FLC and the system buffer. Other "soft" commands may define command and address cycles and/or send/received bytes on the flash lane. The last of the 15 "soft" commands may load a new "soft" context with 15 additional "soft" commands if needed. In one example, the "soft" commands specify the chip enable to use, so it does not matter which linked list was used for the original PCM context.

7. When the "soft" flash operation is completed, a final "soft" command indicates the PCM mode is complete. At this time, the original PCM context is completed and sent to the consumed context manager for notifying the firmware. The FLC may then return to normal mode and begin fetching contexts again from the linked lists supported by the FLC.

Referring to FIG. 10, a diagram of a TABLE 300 is shown illustrating a set of example nano-instructions. In one example, the nanosequencer 246 may comprise a simple sequencer that supports operations specifically tailored to driving the FLC hardware resources used to access the flash devices and move data to and from the datapath. The nanosequencer 246 may be configured to take a "soft" context and allow the controller firmware to set up any arbitrary flash command to run as a part of any context linked list. The firmware has responsibility for the low level timing and characteristics of the command by building up a soft context with the sequence of cycles that are needed to complete the command. A soft context (described below in connection with FIG. 11) may be added to a linked list of contexts, and may be run and disposed of in a similar manner to the normal contexts. The soft context may also be used to accommodate any future flash commands that may be added. The nano-sequencer 246 generally reads the nano-instructions from the context cache. In the processor control mode, the context cache generally contains 32-bit nano-instructions, rather than the FLC contexts. The example instructions illustrated in FIG. 10 are described below.

The most common processor control mode operation is the FLASH_BUS_OPERATION operation. The processor control mode FLASH_BUS_OPERATION instruction is indicated when the first two bits of the soft context dword are ones (e.g., 11). The FLASH_BUS_OPERATION instruction generally allows for any 8-bit flash bus instruction to be applied. In the FLASH_BUS_OPERATION instruction, the lower 30 bits (e.g., bits 29:0) represent the operation to the flash bus controller (FBC) block 212. The lower bits may encode a number of flash bus operation fields including, for example, a flash device or chip enable field (e.g., bits 29:26), an operation type field (e.g., bits 25:23), an operation option field (e.g., bits 22:20), an operation command field (e.g., bits 19:12), an operation length field (e.g., bits 11:9), and an operation data length field (e.g., bits 8:0). The chip enable field may select, in one example, one of sixteen flash device on one of eight chip enable signals to which the flash operation is to be applied. The operation type field may be passed to the flash bus controller. The operation type field generally indicates the type of operation. For example, the operation type field may determine whether the operation is a command (e.g., indicated with 0), an address (e.g., indicated with a value of 1), a read (e.g., indicated with 2), or a write (e.g., indicated with 3). The remaining possible values of the operation type field are generally reserved.

The operation options field generally determines the various operations to be combined. For example, the operation options field allows a command cycle to include an address cycle. The interpretation of the operation options field may differ depending on the OpType field above. For command operations and address operations, the bit definitions may be as follows:

Bit 22: When set, add a command cycle after all other cycles. Uses the operation command field (e.g., OPCOMMAND) field for the command. Only useful for Address Operations;

Bit 21: When set, add address cycles after the initial command cycle. Only useful for Command Operations;

Bit 20: Address Significance. When set, selects the least significant bytes of the address fields to send.

For read and write operations, the bits may be defined as follows:

Bit 22: When set, use immediate data. Useful only for reading status. The status data is used "immediately" in the logic, and not sent to the Dataflow Manager.

Bit 21: When set, add a command cycle after the data cycles. The operation command field is used for the command.

Bit 20: Repeat byte transfer. When set, when using synchronous flash, the data are repeated on both the falling and rising edges of the clock.

The operation command field generally provides the command type for command-type operations. The operation address length field (e.g., ADDRLEN) generally provides the address length (e.g., the number of address bytes) to be sent with the command.

The operation data length field (e.g., DATA LENGTH) generally provides the data length (e.g., the number of data bytes) to be sent/read with the command. The operation data length field is generally for operations less than 512 bytes in length. For operations greater than 512 bytes in length, the field is generally set to all zeroes and the PCM data length register may be used to determine the data length, which will generally be a full page. In general, there is also an operation register in the FBC that may contain the 40-bit address to be used for the transaction and that is not set using this operation, but may be set using the SET_FLASH_ADDRESS operation code or SET DATA TRANSFER LENGTH operation code.

In one example, the nanosequencer operation codes may be implemented as 8 bits in length, aside from the aforementioned FLASH_BUS_OPERATION operation. The nanosequencer operation codes may be located in bits 31:24 of each "soft" command. In addition to performing a specified operation to the flash bus registers of the flash bus controller (e.g., the Flash Bus Operation instruction), the nanosequencer instructions may include waiting for a specified number of clock cycles (e.g., Wait Cycles), waiting for Ready/Busy line to go to a certain state defined in an R/B field (e.g., Wait R/B), waiting for a certain condition while polling the status register (e.g., Wait for Status), waiting for the dataflow manager buffer to reach a particular state (e.g., Wait for Buffer State), setting the number of clock cycles between successive status polling attempts (e.g., Set Polling Period), setting a default number of bytes for data transfers (e.g., Set Data Transfer Length), setting the three most significant bits of the 40-bit flash address for the flash transaction (e.g., Set Flash Row Address), setting the two least significant bytes of the 40-bit flash address for the flash transaction (e.g., Set Flash Column Address), setting the format of the status polling command used by the Wait For Status operation (e.g., Set Status Command Format), obtaining the pass/fail status of an operation using the contents of the most recently obtained status register reading (e.g., Get Pass/Fail Status), initiating a data prefetch operation for a program transaction using one of the two local buffers in the dataflow manager (e.g., Prefetch Data), setting the local data buffer to which the next read transfer should be directed and associating a DMA context pointer with the buffer transfer (e.g., Set Read Data Buffer), disposing of the DMA context pointer for the given operation (e.g., Dispose of Context Pointer), asserting an interrupt to the processor and place the argument in an interrupt register so that it can be identified uniquely by the firmware (e.g., Assert Interrupt), fetching the next soft context pointer in processor control mode (e.g., Fetch Next Soft Context), and escaping from the processor control mode (e.g., Processor Control Mode Done).

In the Wait For Buffer State instruction, the mask field may be set for the compare, where bit 4 is a mask for the Done bit (bit 2), and bit 3 is a mask for the Ready bit (bit 1). For the buffer status, Done means that a full transfer is done (e.g., data has been retrieved from the DMA manager and sent to the flash device, or data has been read from the flash device, and the DMA manager has moved the data out of the dataflow manager). Ready means that data is in the dataflow manager (e.g., data has been retrieved from the DMA manager and is ready to be sent to the flash device, or data has been read from the flash device and is ready to be moved out by the DMA manager). The Bn field generally defines which buffer in the dataflow manager is to be used. In the set Status Command Format instruction, the bitmap field is generally used to determine which bytes of the address are sent for the read status command, and the Command Byte field generally defines what the read status command is. The Get Pass/Fail Status instruction generally uses the Compare Value and Mask fields to obtain a "field", then, by default, "ANDS" all of the bits together to get a single-bit status to send back to the context manager. If the "OR" bit is set, the nano-sequencer ORs the field instead of ANDing the field to obtain the result. If the NE bit is set, the nano-sequencer inverts the resultant bit that is sent to the context manager.

In the Prefetch Data instruction, when the bit WI is cleared, the dataflow manager uses 8-bit data. When the bit WI is set, the dataflow manager uses the value of a flash bus width register bit to determine the width of the transfer. The bit BN generally determines which of the two cut-through buffers in the dataflow manager is to be used. The Context Pointer field contains the context pointer sent to the dataflow manager. In the Dispose of Context Pointer instruction, if the bit W is set, the sequence stalls (or waits) until the context manager reports that the context has been disposed of. If the bit W is not set, the sequence simply continues. When the Fetch Next Soft Context instruction is being executed, the fetching takes place in the context manager. The context manager generally indicates that the context table is not valid until the new sequence has been fetched and is in the context cache.

In general, the processor control mode of operation is restricted, at least in terms of hardware scope, to the flash lane controller (FLC). The flash media controller (FMC) logic outside of the FLC instantiations is generally unaware of how control is occurring inside the flash lane controllers. So that the DMA resources of the FMC can continue to provide their essential services, the DMA resources still utilize firmware to create the conventional "hardware automated" form of contexts that may then be associated with the data transfers issued by the soft contexts in the FLC. The associations may be made using the PREFETCH_DATA and SET_READ_DATA_BUFFER operations, both of which load a context pointer into the Dataflow Manager. The Dataflow Manager then uses the context pointers when making DMA requests to the Data DMA Manager (DDM), as it does in hardware-automated mode. The DDM fetches the context, which provides instruction on chunk descriptor locations, data buffer addresses, skip masks, and other configuration information used to execute the DMA.

Referring to FIG. 11, a diagram of a soft context 400 is shown illustrating how a simple flash program command may be executed using the processor control mode and soft contexts in accordance with an embodiment of the present invention. Each numbered step generally corresponds to a dword in the soft context 400.

0. The PREFETCH_DATA operation is applied with local data buffer number set to 0 and a context pointer set to the location of the "normal" DMA context. The instruction in dword 0 generally causes the Dataflow Manager to assert a request to the Data DMA Manager, which will fetch the DMA context using the context pointer and move the data to the local data buffer in the Dataflow Manager.
1. The SET_FLASH_ROW_ADDRESS operation is applied, with the row address specified in the argument. This will set the internal row address register in the FBC (e.g., op_addr) that is used for the program operation. In general, a SET_FLASH_COLUMN_ADDRESS operation does not necessarily need to be applied, assuming the previous value of the register is acceptable. (Since generally for page reads and writes, the flash column address is all zeroes, the flash column address will be assumed to be all zeroes in this example).
2. The SET_DATA_TRANSFER_LENGTH operation is applied with an argument of 4320, which sets the transfer length to a full page. In general, the register value is held until overridden, so the transfer length does not need to be set for every transaction.
3. The WAIT_FOR_BUFFER_STATE operation is applied with bit 1 set to 1 (wait for full) and bit 0 set to 0 (to wait for buffer 0). This causes the execution to wait until the data is in the buffer before applying the actual program command.
4. A FLASH_BUS_OPERATION operation is applied with the following arguments:
   Chip Enable=0
   Operation Type=COMMAND
   Operation Options=0
   Operation Command=0x80
   Operation Address Length=X
Operation Data Length=X
The instruction in dword 4 tells the flash bus controller to apply a program command cycle to the flash on chip enable 0.
5. A FLASH_BUS_OPERATION operation is applied with the following arguments:
   Chip Enable=0
   Operation Type=ADDRESS
   Operation Options=0
   Operation Command=X
   Operation Address Length=5
   Operation Data Length=X
   The instruction in dword 5 applies the five address cycles in the op_addr register in the flash bus controller to the flash device on chip enable 0.
6. A FLASH_BUS_OPERATION operation is applied with the following arguments:
   Chip Enable=0
   Operation Type=WRITE
   Operation Options=0
   Operation Command=0
   Operation Address Length=X
   Operation Data Length=0

The instruction in dword 6 causes the flash bus controller to move the data from the flash lane data buffer to the flash unit on chip enable 0. The flash bus controller will move all 4320 bytes (as specified in the data transfer length register) because the Operation Data Length field is set to 0. (Note that the flash bus controller allows a command cycle to be applied with a WRITE operation as an optimization. The 0x10 command applied in the following step could be optionally applied here to save one operation.)

7. A FLASH_BUS_OPERATION operation is applied with the following arguments:
Chip Enable=0
Operation Type=COMMAND
Operation Options=0
Operation Command=0x10
Operation Address Length=X
Operation Data Length=X The instruction in dword 7 tells the flash bus controller to apply the second and final command cycle (0x10) to the flash device on chip enable 0.

8. A WAIT_RB operation is applied with argument 1.

The instruction in dword 8 causes the nanosequencer to wait until the flash bus is ready (R/B=1) before applying another command.

9. A FLASH_BUS_OPERATION operation is applied with the following arguments:
Chip Enable=0
Operation Type=COMMAND
Operation Options=0
Operation Command=0x70
Operation Address Length=X
Operation Data Length=X The instruction in dword 9 causes the flash bus controller to apply the READ_STATUS command to the flash unit on chip enable 0.

10. A FLASH_BUS_OPERATION operation is applied with the following arguments:
Chip Enable=0
Operation Type=READ
Operation Options='010'
Operation Command=0x00
Operation Address Length=X
Operation Data Length=1

The instruction in dword 10 causes the flash bus controller to toggle read enable and capture the status of the flash unit. Option bit 1 is set (and the operation data length is set to 1) so that the data will be placed in the immediate data register of the flash bus controller and not in the flash bus controller memory. (Note that the flash bus controller allows a command cycle to be applied with a READ operation as an optimization. The 0x70 command applied in the previous step could have been applied here optionally to save one operation.)

11. A GET_PASS/FAIL_STATUS operation is applied with the following arguments:
Negate, Or-reduce=0
Compare Value="00000001"
Mask="11111110"

The command in dword 11 causes the nanosequencer to compare the value of the unmasked bit, bit 0, of the immediate data register in the flash bus controller to bit 0 of the compare value, which is a 1. If the compare value matches, the resultant is 1, which means that status register bit 0 was indeed a 1, indicating a failure. If the compare value does not match, the resultant is a 0, indicating that the command did not fail. The result may be passed to the CCM along with the consumed context pointer when the context pointer is disposed of.

12. A DISPOSE_OF_CONTEXT_POINTER operation is applied with the context pointer 0xABCD as the argument.

The instruction in dword 12 causes the nanosequencer to send the pointer (and the associated pass/fail bit) to the CCM. This essentially completes the program operation to the flash and the involvement of the flash bus controller.

13. A DONE operation is applied, which causes the flash bus controller to leave the processor control mode and return to "normal" hardware automation mode.

At this point, the FOM informs the Context Table that the soft context processing is complete. This causes the "original" PCM context, which has the "flash operation" field set to PROCESSOR_CONTROL_MODE, to be removed from the Context Table and forwarded to the CCM, where the context is consumed in the same manner as "normal" (or automated) contexts. If the number of operations were to extend beyond 15, a FETCH_NEXT_SOFT_CONTEXT operation would be applied, and the sequencer would continue execution immediately after receiving the new soft context. This mode of operation could continue indefinitely.

The functions performed by the diagrams of FIGS. 1-11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A method of controlling a flash media system, said method comprising:
    providing a flash lane controller having a processor control mode; and
    creating and presenting soft contexts, wherein said soft contexts place the flash lane controller into said processor control mode, where the flash lane controller stores the entire soft context, finishes executing any outstanding contexts, suspends normal hardware automation, and then executes the soft context.

2. The method according to claim 1, wherein said processor control mode is transparent to logic outside of said flash lane controller.

3. The method according to claim 1, wherein said soft contexts present soft commands to said flash lane controller.

4. The method according to claim 3, wherein said soft commands are configured to perform operations that are not natively supported by hardware.

5. The method according to claim 3, wherein said soft commands comprise one or more non-automated commands.

6. The method according to claim 3, wherein said soft commands comprise one or more vendor-specific diagnostic commands.

7. The method according to claim 3, wherein said soft commands comprise one or more error handling commands.

8. The method according to claim 1, wherein upon receiving a soft context said flash lane controller switches from a normal operating mode to the processor control mode, performs one or more soft flash operations specified by one or more soft commands, returns to said normal operating mode, and begins fetching contexts from one or more context lists supported by the flash lane controller.

9. An apparatus comprising:
    a flash lane controller configured to execute contexts to each of a plurality of flash devices attached to said flash lane controller, said flash lane controller having a processor control mode; and
    a nanosequencer disposed within said flash lane controller and configured to support processor control mode operations tailored to driving hardware resources of the flash lane controller for accessing at least one of the flash devices and moving data to and from a datapath.

10. The apparatus according to claim 9, wherein said processor control mode operations are performed in response to a set of nano-instructions for a flash bus operation, waiting for a specified number of clock cycles, waiting for a ready/busy line to go to a certain state defined in a related field, waiting for a certain condition while polling a status register, waiting for a dataflow manager buffer to reach a particular state, setting a number of clock cycles between successive status polling attempts, setting a default number of bytes for data transfers, setting the three most significant bits of a 40-bit flash address for a flash transaction, setting the two least significant bytes of a 40-bit flash address for a flash transaction, setting a format of a status polling command, obtaining a pass/fail status of an operation using the contents of the most recently obtained status register, initiating a data prefetch operation for a program transaction using one of two local buffers in a dataflow manager, setting a local data buffer to which a next read transfer should be directed and associating a DMA context pointer with a buffer transfer, disposing of the DMA context pointer for the given operation, asserting an interrupt to the processor and placing an argument in an interrupt register so that the interrupt can be identified uniquely by firmware, fetching a next soft context pointer in processor control mode, and escaping from the processor control mode.

11. The apparatus according to claim 9, wherein said apparatus is a flash media controller.

12. The apparatus according to claim 11, wherein said apparatus is an integrated circuit.

13. The apparatus according to claim 12, wherein said flash media controller comprises multiple instances of said flash lane controller.

14. The apparatus according to claim 13, wherein said apparatus is part of a solid state storage device comprising a plurality of flash devices arranged in a plurality of flash lanes, each of said flash lanes controlled by a respective one of said multiple instances of said flash lane controller.

15. The apparatus according to claim 11, wherein said processor control mode comprises executing soft contexts that present soft commands to said flash lane controller.

16. The apparatus according to claim 15, wherein said soft commands are configured to perform operations that are not natively supported by hardware of said flash media controller.

17. The apparatus according to claim 9, wherein said processor control mode is transparent to logic outside of said flash lane controller.

18. The apparatus according to claim 16, wherein said soft commands comprise one or more of a non-automated command, a vendor-specific diagnostic command, and an error handling command.

19. The apparatus according to claim 16, wherein said flash lane controller is configured to switch from a normal operating mode to the processor control mode upon receiving a soft context, performs one or more soft flash operations specified by one or more soft commands, returns to said normal operating mode upon completion of said soft context, and begins fetching contexts from one or more context lists supported by the flash lane controller.

20. A solid state storage device comprising:
a flash media controller comprising multiple instances of a flash lane controller, said flash lane controller having a processor control mode configured to execute soft contexts, wherein said soft contexts are configured to perform operations that are not natively supported by hardware of said flash media controller; and
a plurality of flash devices arranged in a plurality of flash lanes, each of said flash lanes controlled by a respective one of said multiple instances of said flash lane controller.

* * * * *